United States Patent
Yan et al.

(10) Patent No.: US 8,073,326 B2
(45) Date of Patent: Dec. 6, 2011

(54) OPTICAL POLARIZATION DIVISION MULTIPLEXING IN OPTICAL COMMUNICATION

(75) Inventors: Lianshan Yan, Monterey Park, CA (US); Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 943 days.

(21) Appl. No.: 11/949,723

(22) Filed: Dec. 3, 2007

(65) Prior Publication Data

US 2008/0138070 A1    Jun. 12, 2008

Related U.S. Application Data

(60) Provisional application No. 60/868,903, filed on Dec. 6, 2006.

(51) Int. Cl.
 *H04B 10/00* (2006.01)
(52) U.S. Cl. ............ 398/30; 398/65; 398/152; 398/195; 398/184
(58) Field of Classification Search ............. 398/65, 398/81, 147, 152, 184, 195, 206, 213
 See application file for complete search history.

(56) References Cited

U.S. PATENT DOCUMENTS

| | | | |
|---|---|---|---|
| 3,302,028 A | 1/1967 | Sterzer | |
| 3,684,350 A | 8/1972 | Wentz | |
| 3,719,414 A | 3/1973 | Wentz | |
| 4,461,543 A | 7/1984 | McMahon | |
| 4,798,436 A | 1/1989 | Mortimore | |
| 5,251,057 A | 10/1993 | Guerin et al. | |
| 5,317,445 A | 5/1994 | DeJule et al. | |
| 5,373,393 A | 12/1994 | DeJule et al. | |
| 5,381,250 A | 1/1995 | Meadows | |
| 5,475,525 A | 12/1995 | Tournois et al. | |
| 5,561,726 A | 10/1996 | Yao | |
| 5,723,856 A | 3/1998 | Yao et al. | |
| 5,751,747 A | 5/1998 | Lutes et al. | |
| 5,777,778 A | 7/1998 | Yao | |
| 5,796,510 A | 8/1998 | Yao | |
| 5,822,100 A * | 10/1998 | Robinson et al. | ............. 398/147 |
| 5,917,179 A | 6/1999 | Yao | |
| 5,929,430 A | 7/1999 | Yao et al. | |
| 5,938,309 A * | 8/1999 | Taylor | ............. 398/79 |
| 5,978,125 A | 11/1999 | Yao | |
| 6,038,357 A * | 3/2000 | Pan | ............. 385/24 |
| 6,178,036 B1 | 1/2001 | Yao | |
| 6,389,197 B1 | 5/2002 | Ilchenko et al. | |
| 6,411,416 B1 * | 6/2002 | Ooi et al. | ............. 398/141 |
| 6,417,957 B1 | 7/2002 | Yao | |
| 6,473,218 B1 | 10/2002 | Maleki et al. | |
| 6,476,959 B2 | 11/2002 | Yao | |

(Continued)

OTHER PUBLICATIONS

Chraplyvy, A.R., et al., "1-Tb/s Transmission Experiment," *IEEE Photonics Technology Letters*, 8(9):1264-1266, Sep. 1996.

(Continued)

*Primary Examiner* — Danny Leung
(74) *Attorney, Agent, or Firm* — Perkins Coie LLP

(57) ABSTRACT

Devices, systems and techniques for optical communication are provided based on polarization division multiplexing (PDM) to use an optical monitor channel at a distinct optical monitor wavelength to monitor optical polarization fluctuation and polarization mode dispersion during the transmission from the transmitter to the receiver to facilitate the effective demultiplexing of the two orthogonal signal channels at the receiver through automatic feedback control on a dynamic polarization controller and a polarization beam splitter.

29 Claims, 7 Drawing Sheets

U.S. PATENT DOCUMENTS

| | | | |
|---|---|---|---|
| 6,480,637 B1 | 11/2002 | Yao | |
| 6,487,233 B2 | 11/2002 | Maleki et al. | |
| 6,487,336 B1 | 11/2002 | Yao | |
| 6,488,861 B2 | 12/2002 | Iltchenko et al. | |
| 6,493,474 B1 | 12/2002 | Yao | |
| 6,498,869 B1 | 12/2002 | Yao | |
| 6,535,328 B2 | 3/2003 | Yao | |
| 6,567,436 B1 | 5/2003 | Yao et al. | |
| 6,576,886 B1 | 6/2003 | Yao | |
| 6,577,413 B1 | 6/2003 | Saunders | |
| 6,580,532 B1 | 6/2003 | Yao et al. | |
| 6,583,903 B1 * | 6/2003 | Way et al. | 398/152 |
| 6,594,061 B2 | 7/2003 | Huang et al. | |
| 6,628,850 B1 | 9/2003 | Yao | |
| 6,628,861 B1 | 9/2003 | Yao | |
| 6,628,862 B1 | 9/2003 | Yao | |
| 6,661,941 B1 | 12/2003 | Yao | |
| 6,661,974 B1 * | 12/2003 | Akiyama et al. | 398/95 |
| 6,671,464 B1 * | 12/2003 | Kikuchi | 398/65 |
| 6,678,431 B2 | 1/2004 | Han et al. | |
| 6,687,423 B1 | 2/2004 | Yao | |
| 6,728,491 B1 * | 4/2004 | Ooi et al. | 398/147 |
| 6,748,134 B2 * | 6/2004 | Bigo et al. | 385/24 |
| 6,754,404 B2 | 6/2004 | Yao | |
| 6,795,481 B2 | 9/2004 | Maleki et al. | |
| 6,795,616 B2 | 9/2004 | Yao | |
| 6,836,327 B1 | 12/2004 | Yao | |
| 6,873,631 B2 | 3/2005 | Yao et al. | |
| 6,873,783 B1 | 3/2005 | Yao | |
| RE38,735 E | 5/2005 | Yao | |
| 6,924,924 B2 * | 8/2005 | Fujiwara et al. | 359/326 |
| 6,925,262 B2 * | 8/2005 | Ooi et al. | 398/147 |
| 6,937,798 B1 | 8/2005 | Yao et al. | |
| 6,944,406 B1 * | 9/2005 | Way | 398/196 |
| RE38,809 E | 10/2005 | Yao | |
| 6,975,454 B1 | 12/2005 | Yan et al. | |
| 7,027,198 B2 | 4/2006 | Yao | |
| 7,064,814 B2 * | 6/2006 | Zaacks et al. | 356/73.1 |
| 7,067,795 B1 | 6/2006 | Yan et al. | |
| 7,127,166 B2 | 10/2006 | Glingener | |
| 7,154,659 B1 | 12/2006 | Yao et al. | |
| 7,157,687 B1 | 1/2007 | Yao | |
| 7,218,436 B2 | 5/2007 | Yao | |
| 7,218,856 B2 * | 5/2007 | Takahara et al. | 398/81 |
| 7,227,686 B1 | 6/2007 | Yan et al. | |
| 7,233,720 B2 | 6/2007 | Yao | |
| 7,257,290 B2 * | 8/2007 | Bulow | 385/27 |
| 7,265,836 B1 | 9/2007 | Yao | |
| 7,265,837 B1 | 9/2007 | Yao | |
| 7,343,100 B2 | 3/2008 | Yao | |
| 7,366,209 B2 * | 4/2008 | Sato | 370/537 |
| 7,369,773 B2 * | 5/2008 | Weiner | 398/81 |
| 7,372,568 B1 | 5/2008 | Yao | |
| 7,382,962 B1 | 6/2008 | Yao | |
| 7,428,349 B2 * | 9/2008 | Hainberger et al. | 385/11 |
| 7,436,569 B2 | 10/2008 | Yao et al. | |
| 7,466,471 B2 | 12/2008 | Yao | |
| 7,522,785 B2 | 4/2009 | Yao | |
| 7,616,900 B2 * | 11/2009 | Isomura et al. | 398/158 |
| 7,723,670 B1 * | 5/2010 | Yan et al. | 250/225 |
| 2001/0008452 A1 * | 7/2001 | Sugihara et al. | 359/124 |
| 2003/0081874 A1 | 5/2003 | Yao | |
| 2003/0175033 A1 * | 9/2003 | Taga et al. | 398/152 |
| 2004/0037495 A1 | 2/2004 | Yao | |
| 2004/0067057 A1 * | 4/2004 | Akiyama et al. | 398/26 |
| 2004/0109220 A1 | 6/2004 | Han et al. | |
| 2004/0131363 A1 * | 7/2004 | Kisaka et al. | 398/152 |
| 2005/0041922 A1 | 2/2005 | Yao | |
| 2005/0047780 A1 | 3/2005 | Hoshida et al. | |
| 2005/0047799 A1 * | 3/2005 | Coppinger et al. | 398/188 |
| 2005/0168659 A1 | 8/2005 | Melton | |
| 2005/0200941 A1 | 9/2005 | Yao | |
| 2005/0201751 A1 | 9/2005 | Yao | |
| 2005/0265728 A1 * | 12/2005 | Yao | 398/152 |
| 2006/0023987 A1 | 2/2006 | Yao | |
| 2006/0115199 A1 | 6/2006 | Yao | |
| 2007/0223078 A1 | 9/2007 | Yao et al. | |
| 2007/0297054 A1 | 12/2007 | Yao et al. | |
| 2008/0030839 A1 | 2/2008 | Yao | |
| 2008/0054160 A1 | 3/2008 | Yao | |
| 2008/0159692 A1 | 7/2008 | Yao | |
| 2008/0159741 A1 * | 7/2008 | Secondini et al. | 398/79 |

OTHER PUBLICATIONS

Hayee, M.I., et al., "Doubling of Bandwidth Utilization Using Two Orthogonal Polarizations and Power Unbalancing in a Polarization-Division-Multiplexing Scheme," *IEEE Photonics Technology Letters*, 13(8):881-883, Aug. 2001.

Heismann, F., et al., "Automatic polarization demultiplexer for polarization-multiplexed transmission systems," *Electronics Letters*, 29(22):1965-1966, Oct. 1993.

Hill, P.M., et al., "Optical Polarization Division Multiplexing at 4 Gb/s," *IEEE Photonics Technology Letters*, 4(5):500-502, May 1992.

Sobiski, D., et al., "Fast first-order PMD compensation with low insertion loss for 10Gbit/s system," *Electronics Letters*, 37(1):46-48, Jan. 2001.

\* cited by examiner

OPTICAL POLARIZATION DIVISION MULTIPLEXING IN OPTICAL COMMUNICATION

PRIORITY CLAIM AND RELATED APPLICATION

This application claims the benefit of U.S. Provisional Application No. 60/868,903 entitled "OPTICAL POLARIZATION DIVISION MULTIPLEXING IN OPTICAL COMMUNICATION" and filed on Dec. 6, 2006, which is incorporated by reference as part of the specification of this application.

BACKGROUND

This application relates to apparatus, systems, and techniques for optical communication.

Communication capacity in communication systems is valuable and various techniques have been developed and investigated to increase capacity of communication systems. In optical communications, spectrally-efficient optical communication techniques have been developed and investigated. Optical wavelength-division multiplexing (WDM), for example, can be used to increase the amount of data to be transmitted in a single fiber by simultaneously transmitting multiple optical WDM channels through the fiber. Dense WDM and ultradense WDM further increase the number of channels that can be carried in a single fiber.

One method for doubling the spectral efficiency and system capacity is polarization-division-multiplexing (PDM), in which two independently modulated data channels located at the same optical wavelength are simultaneously transmitted on orthogonal polarization states of the fiber. For systems with low polarization-mode-dispersion (PMD) and polarization-dependent-loss (PDL), PDM can be used for upgrading existing fiber links or for the deployment of spectrally-efficient new optical fiber systems.

SUMMARY

This application describes, among others, examples and implementations of apparatus, systems and techniques for optical communication based on polarization division multiplexing (PDM) using an optical monitor channel to facilitate the effective demultiplexing of the two orthogonal signal channels through automatic feedback control on a dynamic polarization controller and a polarization beam splitter.

In one implementation, an optical communication system for optical communicating based on polarization division multiplexing (PDM) includes a PDM transmitter to produce light comprising (1) a first optical signal carrying a first data channel in a first optical polarization and at an optical signal wavelength, (2) a second optical signal carrying a second data channel at a second optical polarization different from the first optical polarization and at the optical signal wavelength, and (3) light at a monitor signal wavelength different from the optical signal wavelength and in the first optical polarization; a transmission link to receive and transmit the light from the PDM transmitter; and a PDM receiver to receive light from the transmission link. The PDM receiver includes a dynamic polarization controller to control polarization of the received light in response to a control signal to produce output light; a polarization beam splitter to split the output light from the dynamic polarization controller into (1) a first beam comprising the first optical signal at the optical signal wavelength and (2) a second beam comprising a second optical signal at the optical signal wavelength, wherein the first and second beams are in orthogonal polarizations to each other; a monitor beam splitting unit in an optical path of the first beam to split the first beam into (1) a monitor beam at the monitor signal wavelength and (2) the first optical signal; a first optical detector to receive and detector the first optical signal; a second optical detector to receive at least a portion of the second beam to detect the second optical signal; an optical monitor detector to receive and detect the monitor beam; and a feedback control unit to produce the control signal based an output of the optical monitor detector to control the polarization of light to the polarization beam splitter to increase optical power of the monitor beam detected at the optical monitor detector and to separate the first data channel and the second data channel into the first optical signal and the second optical signal, respectively.

In another implementation, an optical communication system for optical communicating based on polarization division multiplexing (PDM) includes a PDM transmitter comprising (1) a first optical transmitter to produce a first optical signal carrying a first data channel in a first optical polarization and at a first optical signal wavelength, (2) a second optical transmitter to produce a second optical signal carrying a second data channel at a second optical polarization different from the first optical polarization and at a second optical signal wavelength that is different from the first optical signal wavelength, and (3) a third optical transmitter to produce light at a monitor signal wavelength different from the first and the second optical signal wavelengths and in the first optical polarization; a transmission link to receive and transmit the light from the PDM transmitter; and a PDM receiver to receive light from the transmission link. The PDM receiver includes a dynamic polarization controller to control polarization of the received light in response to a control signal to produce output light; a polarization beam splitter to split the output light from the dynamic polarization controller into (1) a first beam comprising the first optical signal at the first optical signal wavelength and (2) a second beam comprising a second optical signal at the second optical signal wavelength, wherein the first and second beams are in orthogonal polarizations to each other; a monitor beam splitting unit in an optical path of the first beam to split the first beam into (1) a monitor beam at the monitor signal wavelength and (2) the first optical signal; a first optical detector to receive and detector the first optical signal; a second optical detector to receive at least a portion of the second beam to detect the second optical signal; an optical monitor detector to receive and detect the monitor beam; and a feedback control unit to produce the control signal based an output of the optical monitor detector to control the polarization of light to the polarization beam splitter to increase optical power of the monitor beam detected at the optical monitor detector and to separate the first data channel and the second data channel into the first optical signal and the second optical signal, respectively.

In yet another implementation, a method for optical communications based on polarization division multiplexing (PDM) includes generating an optical PDM transmission signal that comprises (1) a first optical signal carrying a first data channel in a first optical polarization and at a first optical signal wavelength, (2) a second optical signal carrying a second data channel at a second optical polarization different from the first optical polarization and at a second optical signal wavelength, and (3) light at a monitor signal wavelength different from the first and second optical signal wavelengths and in the first optical polarization; and transmitting the optical PDM transmission signal over a transmission link to a destination. This method includes the following at the destination: controlling a dynamic polarization controller to control polarization of the received light in response to a control signal; using a polarization beam splitter to split output light from the dynamic polarization controller into a first beam and a second beam, wherein the first and second beams being in orthogonal polarizations; splitting the first beam into (1) a monitor beam at the monitor signal wavelength and (2) a first detector beam at one or more wavelengths different from the monitor signal wavelength; using a first optical detector to receive and detect the first detector beam to extract the first data channel; using a second optical detector to receive and detect at least a portion of the second beam to extract the second data channel; using an optical monitor detector to receive the monitor beam and to measure optical power of the monitor beam; and operating a feedback control unit to produce the control signal based on the measured optical power at the optical monitor detector to control the polarization of light incident to the polarization beam splitter to increase the measured optical power of the monitor beam detected at the optical monitor detector.

In yet another implementation, a method for optical communications based on polarization division multiplexing (PDM) includes generating an optical PDM transmission signal that comprises (1) a first optical signal carrying a first data channel with a first spectrum width in a first optical polarization and at an optical signal wavelength, (2) a second optical signal carrying a second data channel with a second spectrum width less than the first spectrum width at a second optical polarization different from the first optical polarization and at the optical signal wavelength; and transmitting the optical PDM transmission signal over a transmission link to a destination. This method includes the following at the destination: controlling a dynamic polarization controller to control polarization of the received light in response to a control signal; using a polarization beam splitter to split output light from the dynamic polarization controller into a first beam and a second beam, wherein the first and second beams being in orthogonal polarizations splitting the first beam into (1) a monitor beam and (2) a first detector beam; optically filtering the monitor beam to produce a filtered monitor beam that is centered at an optical monitor signal wavelength outside the second spectrum width of the second data channel carried by the first beam; using a first optical detector to receive and detect the first detector beam to extract the first data channel; using a second optical detector to receive and detect the second beam to extract the second data channel; using an optical monitor detector to receive the filtered monitor beam and to measure optical power of the filtered monitor beam; and operating a feedback control unit to produce the control signal based on the measured optical power at the optical monitor detector to control the polarization of light incident to the polarization beam splitter to increase the measured optical power of the monitor beam detected at the optical monitor detector.

In yet another implementation, an optical communication system utilizing polarization division multiplexing (PDM) includes a PDM optical transmitter that produces an optical PDM signal which comprises (1) two optical data channels in first and second mutually orthogonal optical polarizations that respectively carry two different data channels and (2) one optical monitor channel in the first optical polarization; an optical fiber transmission link coupled to receive the optical PDM signal from the PDM transmitter and to transmit the optical PDM signal to a destination; and a PDM receiver located at the destination and coupled to an end of the optical fiber transmission link to demultiplex the two optical data channels received from the optical fiber transmission link, the PDM receiver comprising an optical monitor detector that detects the optical monitor channel and a feedback control loop using monitor channel information in an output of the optical monitor detector to control the demultiplexing of the two optical data channels.

In yet another implementation, an optical communication system based on polarization division multiplexing (PDM) includes a PDM transmitter that produces a PDM transmission signal comprising two different optical data channels that are multiplexed based on PDM, wherein the PDM transmitter produces an optical monitor channel in the same optical polarization with one of the two optical data channels, which is included with the two optical channels in orthogonal polarizations as part of the optical PDM transmission signal. A transmission link is provided to transmit the PDM transmission signal and a PDM receiver is also provided to receive the PDM transmission signal and demultiplex the received PDM transmission signal to recover two different data channels that are multiplexed based on PDM. The PDM receiver extracts and detects the optical monitor channel to provide a feedback control in the polarization demultiplexing.

These and other implementations and examples of the apparatus, systems and techniques for optical communication based on PDM are described in greater detail in the drawings, the detailed description and the claims.

DETAILED DESCRIPTION

Figure 1:
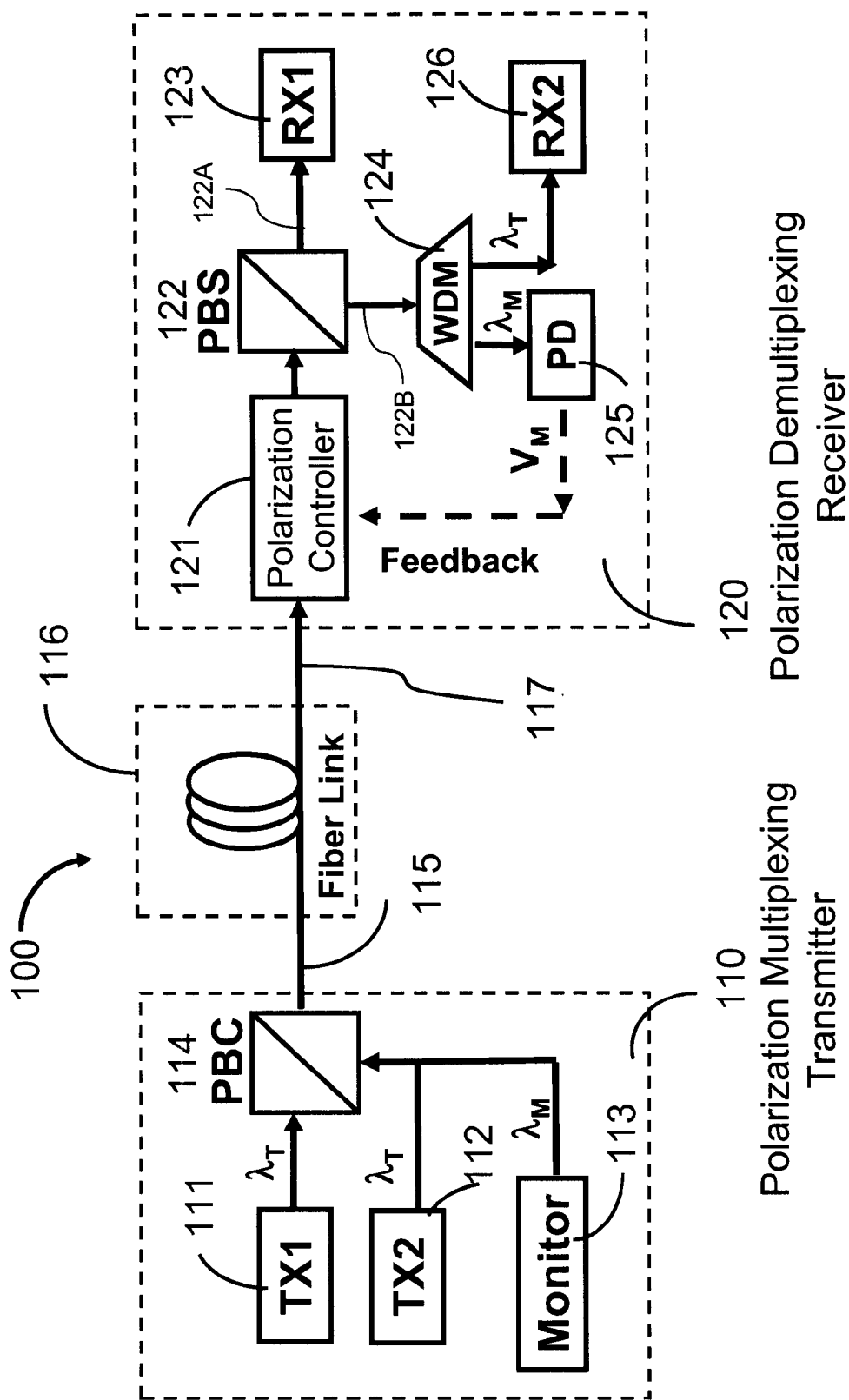
FIGS. 1, 1A, 2 and 3 show exemplary optical communication systems that use optical polarization division multiplexing technology, where the PDM receiver uses the information from an optical monitor channel as the feedback to control polarization demultiplexing.
Figure 2:
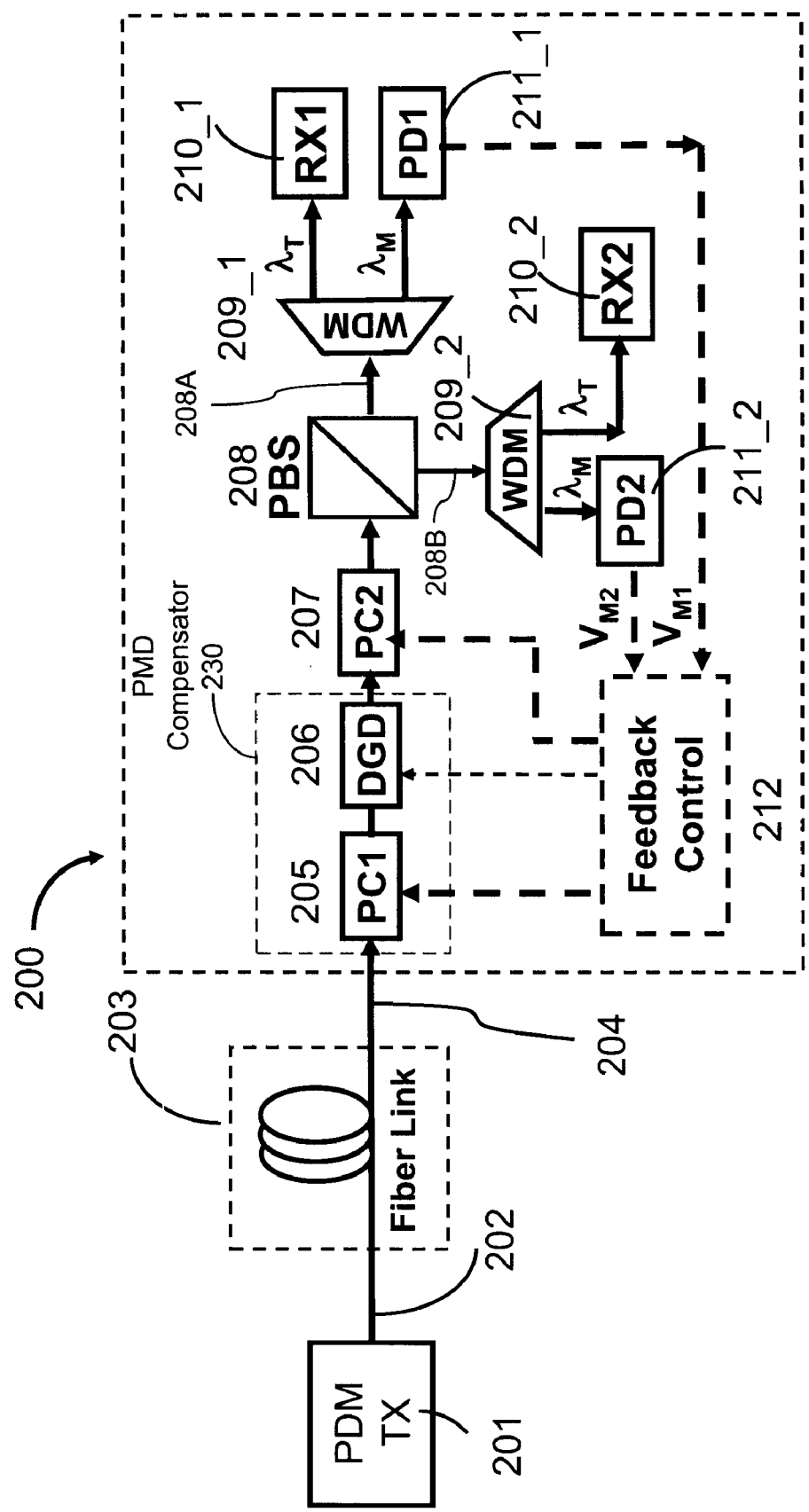
Figure 3:
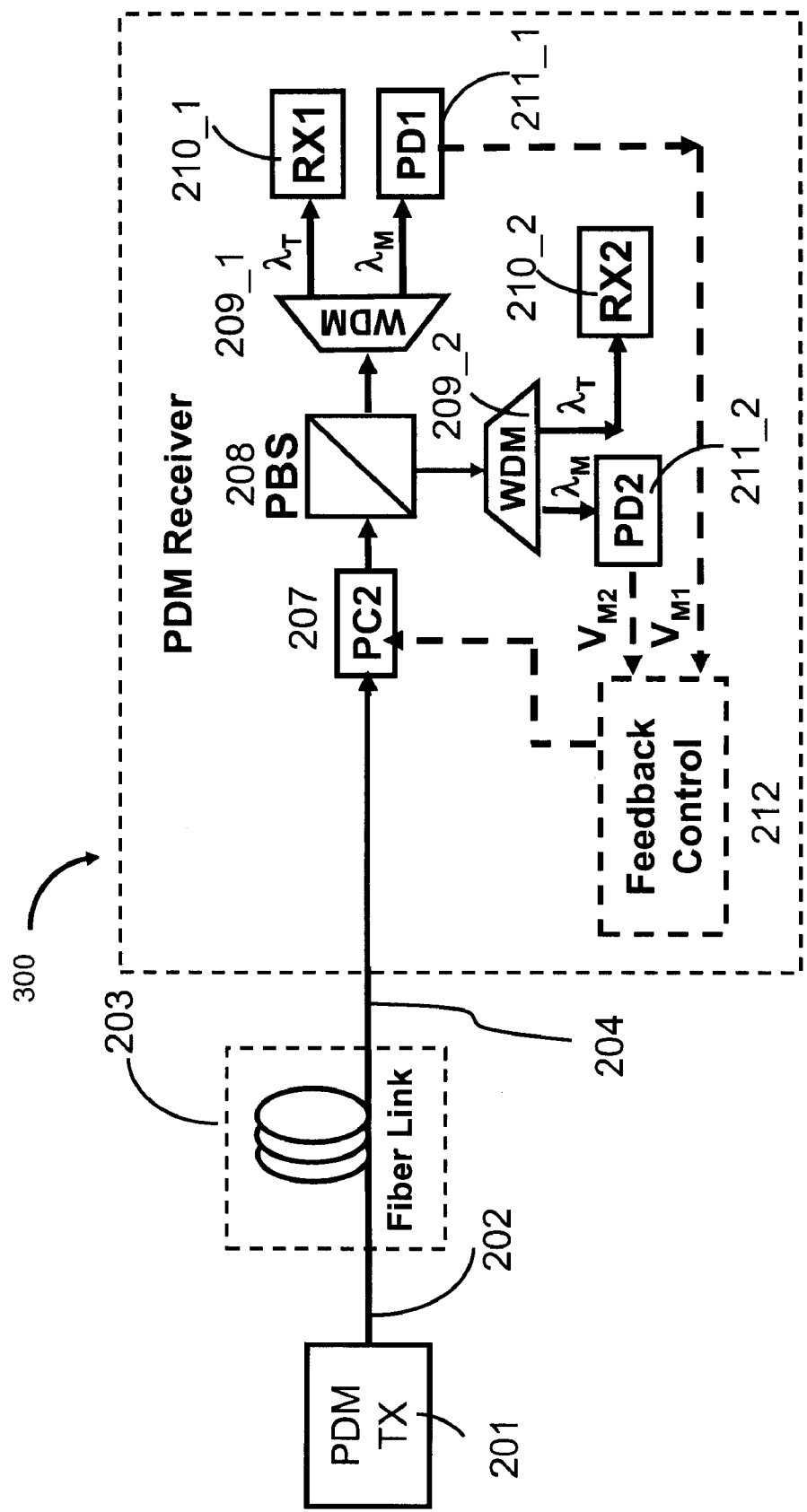

FIGS. 1, 2 and 3 illustrate three examples of optical PDM communication systems. Each system includes a PDM transmitter that produces a PDM transmission signal, a transmission link and a PDM receiver that receives the PDM transmission signal and demultiplexes the received PDM transmission signal to recover two different channels that are multiplexed based on PDM. An optical monitor channel in the same optical polarization with one of the two optical channels is generated at the PDM transmitter and is included with the two optical channels in orthogonal polarizations as part of the optical PDM transmission signal. This optical monitor channel is then extracted and detected at the PDM receiver to provide a feedback control in the polarization demultiplexing.

The state of polarization of light often fluctuates when transmitting through an optical transmission medium due to various factors, e.g., inherent optical birefringence in the medium or induced optical birefringence caused by the surrounding conditions of the media (such as stresses). Many commercial optical fibers are known to be optically birefringent and exhibit different refractive indices for light with different polarizations. Often, fiber birefringence is characterized along two orthogonal principal directions. Causes for such birefringence in fibers include, among others, imperfect circular core and unbalanced stresses in a fiber along different transverse directions. Notably, the axis of birefringence of the optical fiber may change randomly over time. This random nature in optical polarization of light can render the implementations of polarization multiplexing difficult and challenging.

Significant challenges remain for the practical deployment of PDM systems, especially in the PMD receiver design. The PMD receiver must be capable of separating and detecting the two independent, orthogonal data channels simultaneously, with comparable performance. This detection should exhibit a low power penalty, accommodate very high data rates (e.g >40-G/bs/channel), and be independent of the data format and the data bit rate. Moreover, tracking the polarization state of the data channels may be necessary and can often be technically challenging. Examples of some PDM receiver designs include: (i) monitoring of the clock tone or pilot tones (ii) multi-level electronic detection, and (iii) crosstalk correlation. Implementations of these schemes can suffer one or more of the following drawbacks: (i) requiring high-speed electronics, thereby leading to undesired dependence of the demultiplexing operation on the bit-rate; (ii) presence of additive system power penalties; and (iii) requiring modification or even significant re-design of the existing transceiver line card.

The use of an optical monitor channel in the same optical polarization with one of the two optical channels in the PDM transmission signal can be used to mitigate various technical problems associated with the polarization fluctuations to the polarization components in the PDM transmission signal. This optical monitor channel is extracted and detected at the PDM receiver to provide a feedback control in the polarization demultiplexing. In some implementations, this optical monitor channel can also be used for, in addition to the polarization demultiplexing, providing feedback control for compensation of the polarization mode dispersion in the PDM transmission signal in the PDM receiver.

FIG. 1 shows an exemplary optical communication system 100 utilizing polarization division multiplexing (PDM) technology. The PDM transmitter 110 includes two optical transmitters (TX1, 111 and TX2, 112) that produce laser beams at the same optical wavelength or different optical wavelengths and in two mutually orthogonal polarization states. The optical transmitters 111 and 112 are operated to modulate the laser beams to superimpose two data channels on their laser beams to produce optical data channels. The illustrated example uses the same wavelength ($\lambda_T$) for both optical data channels. A third optical monitor transmitter 113 is used to produce an optical monitor channel utilizing some dummy or un-used optical monitor wavelength ($\lambda_M$) that is different from the wavelength of the two data channels and is aligned to the same polarization state with one of the data channels (e.g., the polarization of the optical data channel from the transmitter TX2). An optical beam combiner can be used to combine the optical data channel from the optical transmitter TX2 and the optical monitor channel in the same polarization to produce a combined beam. As such, there are two orthogonal polarization states at the transmitter side. These two polarization states are combined together using a polarization beam combiner (PBC, 114) to produce a PDM transmission signal 115 that includes the two orthogonally polarized optical data channels and the optical monitor channel. The PDM transmission signal (115) is directed to transmit through an optical link (116) as transmitted signals 117 to a PDM receiver 120.

Notably, the optical monitor channel travels with the two optical data channels through the same optical path via the optical link 116 and thus undergoes the same or similar polarization mode dispersion and polarization fluctuations during the transmission. On one hand, the optical monitor wavelength ($\lambda_M$) is selected to be sufficiently different from the optical wavelength of each of the two optical data channels generated by optical transmitters TX1 and TX2 to allow for optical separation of the optical monitor channel at the PDM receiver by optical filtering or optical wavelength demultiplexing. On the other hand, the optical monitor wavelength ($\lambda_M$) can be selected closer to the optical wavelength of the optical data channel in the same optical polarization than the optical wavelength of the other optical data channel in the orthogonal optical polarization so that the polarization mode dispersion and polarization fluctuations experienced by the optical monitor channel during the transmission be similar to those experienced by the optical data channel in the same optical polarization.

In the example shown in FIG. 1, the PDM receiver 120 includes a dynamic polarization controller (121) followed by a polarization beam splitter (PBS, 122). The PBS 122 is used to demultiplex the two orthogonal polarization states simultaneously, i.e. into two signals in two separate signal arms 122A and 122B. The signal arm 122A is used to direct one data channel directly to an optical receiver RX1 123. Since the other data channel (channel 2) and the monitor channel have the orthogonal polarization states to the polarization of the optical channel 1, they will pass to the other signal arm 122B due to the operation of the PBS 122. In order to separate these two components in the signal arm 122B, a wavelength demultiplexer (WDM) or an optical filter 124 can be used to separated light components at $\lambda_M$ and $\lambda_T$ into two different output ports. The data channel ($\lambda_T$) is directed to the optical receiver 126 (RX2) for detection while the optical monitor channel is directed to a photodetector PD 125 to measure the optical power of the optical monitor channel.

In the case of having the same wavelength for both data channels, one technical issue at the PDM receiver 120 is how to perform effective tracking on the input polarization using the dynamic polarization controller 121 in order to demultiplex the two data channels in the received PDM transmission signal by the combined operations of the polarization controller 121 and the PBS 122 into the two signal arms 122A and 122B. Using either polarization state may easily fail because of loss of signals in either signal arm. The optical monitor channel at a different wavelength from the optical data channels is available and thus can be separated out and detected. The information in the optical monitor channel can be used as the feedback signal on the polarization controller 121 for effective polarization tracking and demultiplexing the data channels simultaneously by maximizing the power of the detected optical monitoring channel output by the optical monitor photodetector 125.

Figure 1A:
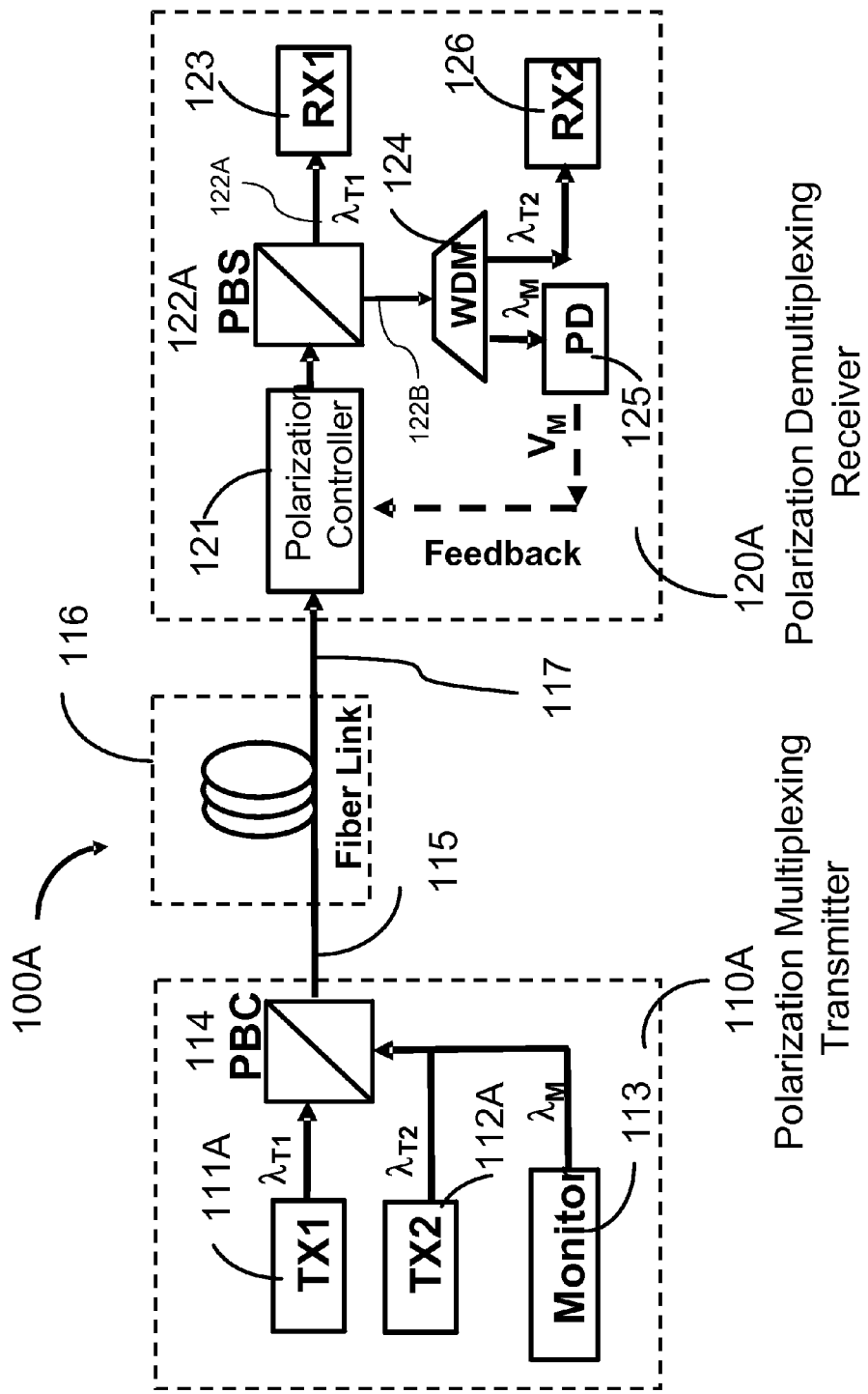

This technique can be used for two optical data channels that are at different optical wavelengths $\lambda_{T1}$ and $\lambda_{T2}$ and the optical monitor channel wavelength $\lambda_M$ is set to be closer to $\lambda_{T2}$, the wavelength of the optical data channel in the same polarization as the optical monitor channel. As an example, an optical communication system 100A shown in FIG. 1A for optical communicating based on PDM includes a PDM transmitter 110A, a transmission link 116 to receive and transmit the light from the PDM transmitter 110A; and a PDM receiver 120A to receive light from the transmission link 116. The PDM transmitter 110A includes (1) a first optical transmitter 111A to produce a first optical signal carrying a first data channel in a first optical polarization and at a first optical signal wavelength $\lambda_{T1}$, (2) a second optical transmitter 112A to produce a second optical signal carrying a second data channel at a second optical polarization different from the first optical polarization and at a second optical signal wavelength $\lambda_{T2}$ that is different from the first optical signal wavelength $\lambda_{T1}$, and (3) a third optical transmitter 113 to produce light at a monitor signal wavelength $\lambda_M$ different from the first and the second optical signal wavelengths $\lambda_{T12}$ and $\lambda_{T2}$ and in the first optical polarization. The PDM receiver 120A includes a dynamic polarization controller 121 to control polarization of the received light in response to a control signal to produce output light; a polarization beam splitter 112A to split the output light from the dynamic polarization controller into (1) a first beam comprising the first optical signal at the first optical signal wavelength $\lambda_{T1}$ and (2) a second beam comprising a second optical signal at the second optical signal wavelength $\lambda_{T2}$ and the optical monitor channel wavelength $\lambda_M$ that is set to be closer to $\lambda_{T2}$. The first and second beams are in orthogonal polarizations to each other. A monitor beam splitting unit 124 is provided in an optical path of the second beam to split the second beam into (1) a monitor beam at the monitor signal wavelength $\lambda_M$ and (2) the second optical signal. A first optical detector 123 is used to receive and detector the first optical signal. A second optical detector 126 is used to receive at least a portion of the second beam to detect the second optical signal. In addition, an optical monitor detector 125 is used to receive and detect the monitor beam. This system 100A also includes a feedback control unit to produce the control signal based an output of the optical monitor detector 125 to control the polarization of light to the polarization beam splitter to increase optical power of the monitor beam detected at the optical monitor detector 125 and to separate the first data channel and the second data channel into the first optical signal and the second optical signal, respectively.

One of technical difficulties for practical deployment of optical communication systems utilizing PDM technology is the effect of polarization mode dispersion (PMD). PMD can introduce crosstalk between two orthogonal data channels and hence may invalidate the polarization demultiplexing. The design in FIG. 1 provides the monitoring information and, based on the monitoring information, a PMD compensator can be added before an optical detector for each of the two optical data channels.

FIG. 2 shows an exemplary optical communication system that uses a PDM receiver 200 based on a PMD compensation mechanism. The PDM transmitter 201 can be implemented by using the same PDM transmitter 110 in FIG. 1 and the wavelengths of the two optical data channels can be the same or at different optical wavelengths. The optical PDM transmission signal 202 includes the two orthogonally polarized optical data channels and the optical monitor channel in the same optical polarization with one of the two optical data channels. The signal 202 is directed to pass through a fiber link 203 with certain PMD as an ending signal 204 before the PDM receiver 200.

The PDM receiver 200 includes a PMD compensator 230 that includes a dynamic polarization controller (PC1, 205) and a fixed or variable differential-group-delay (DGD) element (DGD, 206). After the PMD compensator, again, a second polarization controller (PC2, 207) and a polarization beam splitter (PBS, 208) are used for polarization demultiplexing by separating received light into two signal arms 208A and 208B with orthogonal polarizations. Unlike the scheme in FIG. 1, two WDMs (or filters) (209_1 & 209_2) are added into both polarization arms (RX1 and RX2, 210_1 and 210_2). Filtered monitor channel $\lambda_M$ power levels (corresponding to output voltages, $V_{M1}$ and $V_{M2}$) are detected through photodectors (211_1 and 211_2) and used as the feedback control (212) parameters to optimize both the first and second polarization controllers, where the DGD values may be optimized as well if a variable DGD is used. For example, when the optical polarization of the optical monitor channel in the PDM transmitter 201 is set to be the same as the polarization for the second optical data channel to be detected by the optical receiver RX2, the PMD compensator 230 and the polarization controller 207 can be controlled to maximize or increase the optical power of the optical monitor channel detected by the detector PD2 in one signal arm 208B while minimizing or decreasing the optical power of the optical monitor channel detected by the detector PD1 in the other signal arm 208A.

PMD in the system in FIG. 2 can introduce undesired crosstalk between the two optical data channels. The optical monitor channel in one of the signal arms, 208A ($\lambda_{M1}$), can be used to provide the crosstalk information, and the optical monitor channel in the other signal arm 208B ($\lambda_{M2}$) can be used for the polarization demultiplexing. The combination of these two parameters obtained by the two optical monitor detectors PD1 and PD2 can be optimized during feedback control.

The example in FIG. 2 shows for both PMD compensation and polarization demultiplexing, certainly the use of two feedback signals from the two signal arms can also be applied to PDM receiver without the PMD compensation. FIG. 3 illustrates one example of such a PDM system where the PDM receiver 300 uses a polarization controller 207 upstream from the PBS 208 without a PMD compensator.

Figure 4:
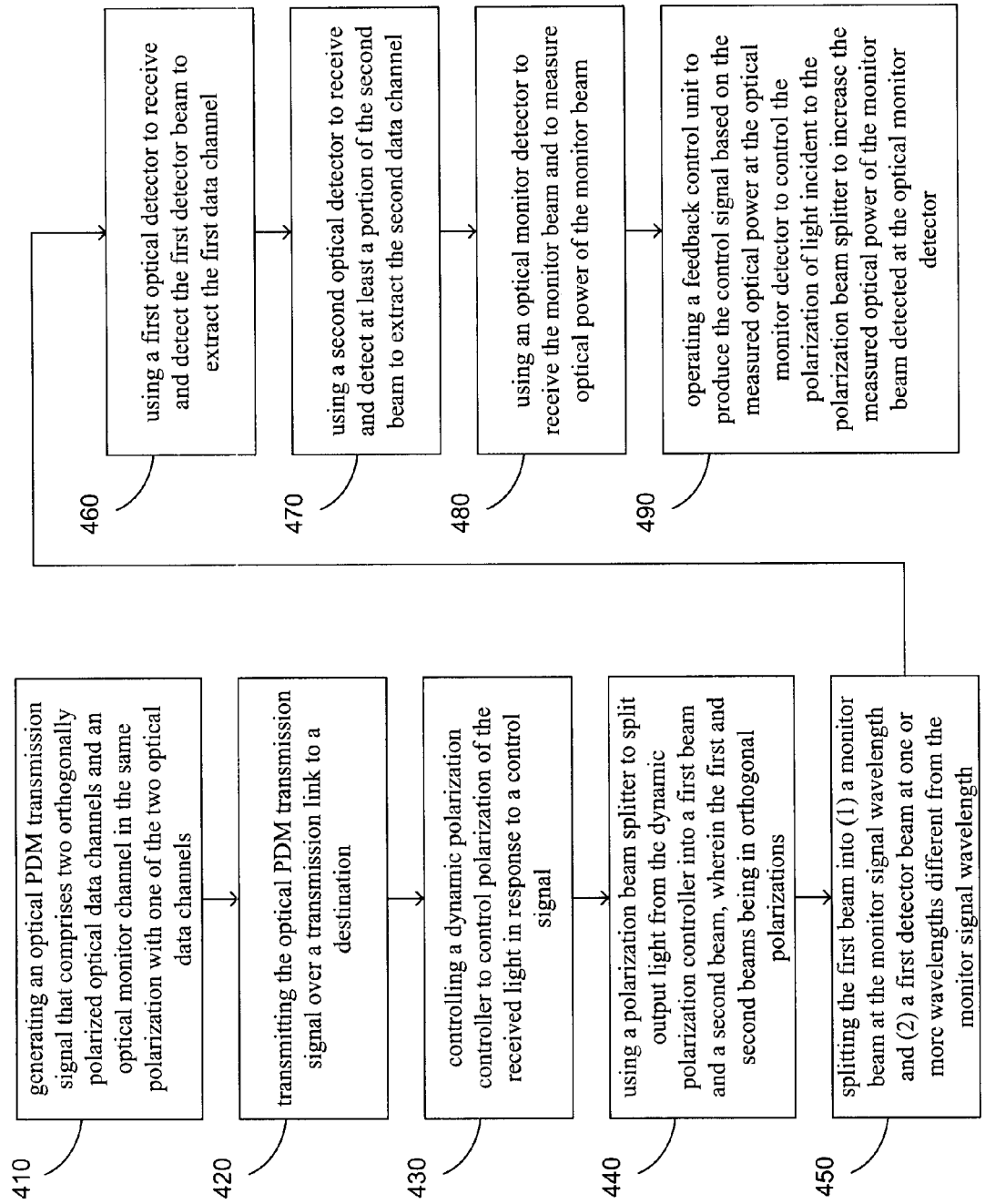
FIG. 4 shows an example for the processing steps for optical communication based on polarization division multiplexing.

FIG. 4 shows an example for the processing steps for optical communication based on polarization division multiplexing. Step 410 is generation of an optical PDM transmission signal that comprises (1) a first optical signal carrying a first data channel in a first optical polarization and at a first optical signal wavelength, (2) a second optical signal carrying a second data channel at a second optical polarization different from the first optical polarization and at a second optical signal wavelength, and (3) light at a monitor signal wavelength different from the first and second optical signal wavelengths and in the first optical polarization. At step 420, the optical PDM transmission signal is transmitted over a transmission link to a destination. This method includes the following at the destination: controlling a dynamic polarization controller to control polarization of the received light in response to a control signal (step 430); using a polarization beam splitter to split output light from the dynamic polarization controller into a first beam and a second beam, wherein the first and second beams being in orthogonal polarizations (step 440); splitting the first beam into (1) a monitor beam at the monitor signal wavelength and (2) a first detector beam at one or more wavelengths different from the monitor signal wavelength (step 450); using a first optical detector to receive and detect the first detector beam to extract the first data channel (step 460); using a second optical detector to receive and detect at least a portion of the second beam to extract the second data channel (step 470); using an optical monitor detector to receive the monitor beam and to measure optical power of the monitor beam (step 480); and operating a feedback control unit to produce the control signal based on the measured optical power at the optical monitor detector to control the polarization of light incident to the polarization beam splitter to increase the measured optical power of the monitor beam detected at the optical monitor detector (step 490).

Figure 5:
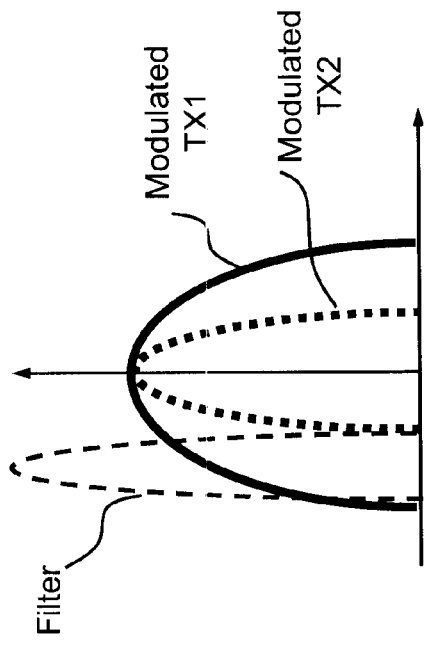
FIG. 5 illustrates an example of an optical filtering technique in the PDM receiver to generate an optical monitor channel for the feedback control in polarization demultiplexing in the PDM receiver when two data channels that are multiplexed via PDM have different data rates.

In some implementations of PDM systems, if the two data channels at the same wavelength are used to carry data streams at different speeds, these two channels can have different spectrum widths after optical modulation. Therefore, instead of adding another monitor wavelength channel at the transmitter side, it is also possible to filter out part of the data spectrum for the channel with a wider optical spectrum and use the signal that is filtered out as the monitor information for the polarization demultiplexing at the PDM receiver side only. FIG. 5 illustrates an example how the optical filtering is to generate the monitor signal. The transmission (filter) spectrum of the optical filter should be optimized to minimize the overlapping with the narrow-spectrum data channel.

Figure 6:
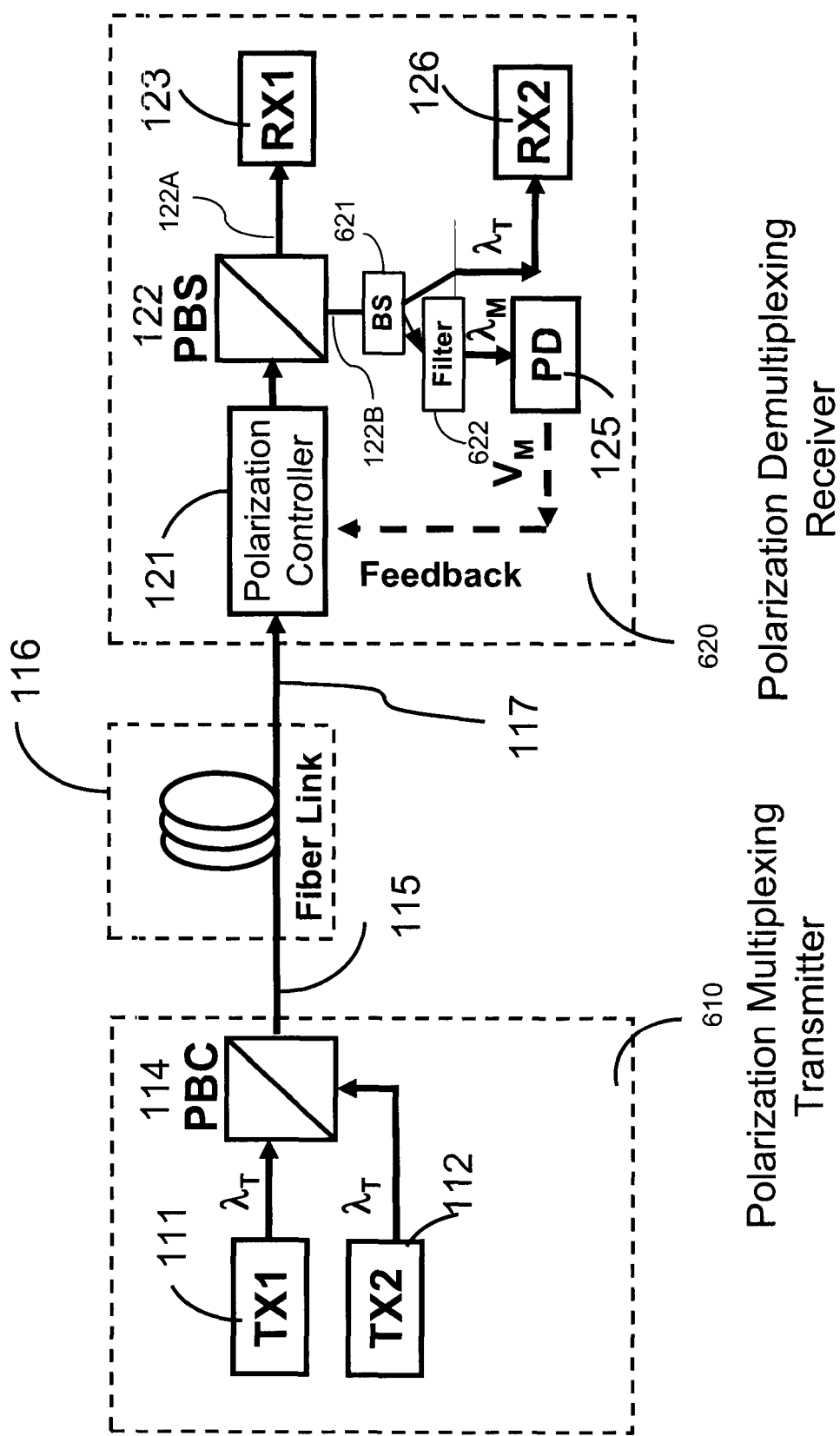
FIG. 6 shows an example of an optical communication system that implements the optical filtering technique shown in FIG. 5.

FIG. 6 shows an example of an optical communication system that implements the optical filtering technique shown in FIG. 5. The PDM transmitter 610 includes two optical transmitters TX1 (111) and TX2 (112) operating at the same optical wavelength $\lambda_T$ to generate generating an optical PDM transmission signal 115 that comprises (1) a first optical signal carrying a first data channel with a first spectrum width in a first optical polarization and at an optical signal wavelength, (2) a second optical signal carrying a second data channel with a second spectrum width less than the first spectrum width at a second optical polarization different from the first optical polarization and at the optical signal wavelength. The fiber link 116 is used to transmit the optical PDM transmission signal 115 to a destination with the PDM receiver 620. The PDM receiver 620 can be implemented by modifying the PDM receiver in FIG. 1 by providing a beam splitter 621 to split the light in the signal arm 122B from the PBS 122 into (1) a monitor beam and (2) a first detector beam. An optical filter 622 is provided to optically filter the monitor beam to produce a filtered monitor beam that is centered at an optical monitor signal wavelength outside the second spectrum width of the second data channel carried by the first beam. The first detector beam is directed into the optical receiver RX2 (126) to extract the respective data channel. The optical monitor detector PD 125 is used to receive the filtered monitor beam and to measure optical power of the filtered monitor beam. The feedback control unit is operated to produce the control signal based on the measured optical power at the optical monitor detector to control the polarization of light incident to the polarization beam splitter to increase the measured optical power of the monitor beam detected at the optical monitor detector.

Figure 7:
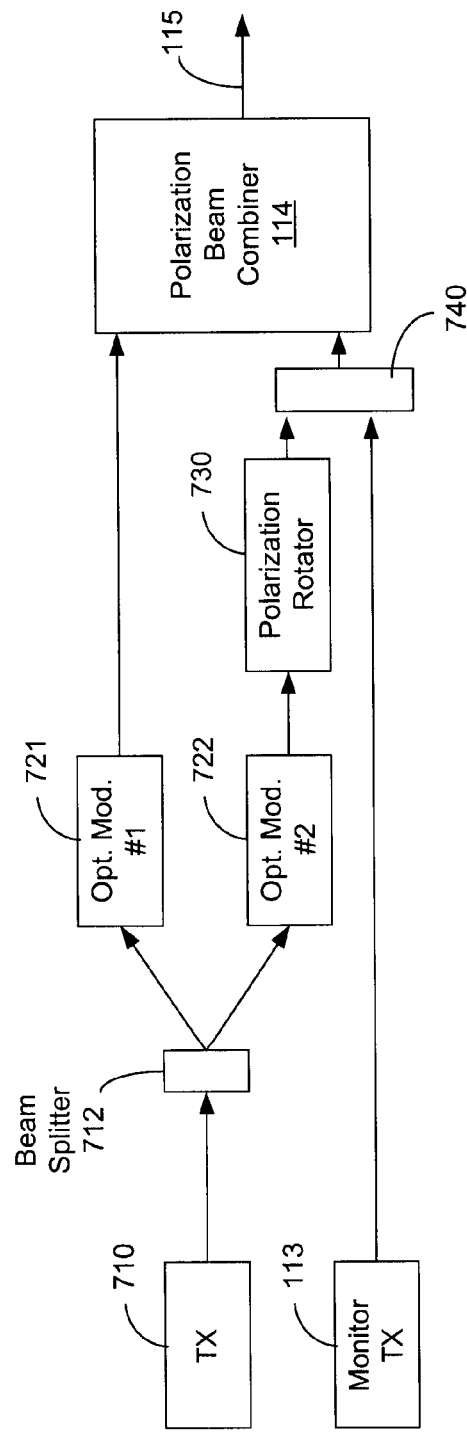
FIG. 7 shows an example for generating two optical channels with orthogonal polarizations based on a single laser source.

In PDM systems where two polarization multiplexed optical data channels are at the same optical wavelength, a single laser and two optical modulators can be used to produce the two optical data channels. FIG. 7 shows an example for generating two optical channels with orthogonal polarizations based on a single laser source TX 710. The output CW laser beam from the laser 710 is in the first optical polarization and is directed to a beam splitter 712 which splits the beam into a first CW laser beam and a second CW laser beam, both in the first optical polarization. Two optical modulators 721 and 722 are provided to modulate the two CW laser beams, respectively, to carry the first data channel as the first optical signal and to carry the second data channel to produce a modulated second light beam. A polarization rotator 730 is provided to receive the modulated second light beam from the optical modulator 722 and to rotate polarization of the modulated second light beam to be in the second optical polarization orthogonal to the first optical polarization as the second optical signal. In addition, an optical monitor transmitter 113 is provided to produce the optical monitor channel at the monitor signal wavelength. A beam combiner 740 is used to combine the light at the monitor signal wavelength and the first optical signal into a combined beam in the first optical polarization. A polarization beam combiner 114 is used to combine the combined beam and the second optical signal into the light 115, i.e., the PDM transmission signal, output by the PDM transmitter.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features, that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few embodiments are disclosed. However, it is understood that variations and enhancements may be made.

What is claimed is:

1. An optical communication system for optical communicating based on polarization division multiplexing (PDM), comprising:
   a PDM transmitter to produce light comprising (1) a first optical signal carrying a first data channel in a first optical polarization and at an optical signal wavelength, (2) a second optical signal carrying a second data channel at a second optical polarization different from the first optical polarization and at the optical signal wavelength, and (3) light at a monitor signal wavelength different from the optical signal wavelength and in the first optical polarization;
   a transmission link to receive and transmit the light from the PDM transmitter; and
   a PDM receiver to receive light from the transmission link and comprising:
      a dynamic polarization controller to control polarization of the received light in response to a control signal to produce output light;
      a polarization beam splitter to split the output light from the dynamic polarization controller into (1) a first beam comprising the first optical signal at the optical signal wavelength and (2) a second beam comprising a second optical signal at the optical signal wavelength, wherein the first and second beams are in orthogonal polarizations to each other;
      a monitor beam splitting unit in an optical path of the first beam to split the first beam into (1) a monitor beam at the monitor signal wavelength and (2) the first optical signal;
      a first optical detector to receive and detect the first optical signal;
      a second optical detector to receive at least a portion of the second beam to detect the second optical signal;
      an optical monitor detector to receive and detect the monitor beam; and
      a feedback control unit to produce the control signal based an output of the optical monitor detector to control the polarization of light to the polarization beam splitter to increase optical power of the monitor beam detected at the optical monitor detector and to separate the first data channel and the second data channel into the first optical signal and the second optical signal, respectively.

2. The system as in claim 1, wherein the PDM receiver comprises:
a second monitor beam splitting unit in an optical path of the second beam to split the second beam into (1) a second monitor beam at the monitor signal wavelength and (2) the second optical signal directed to the second optical detector; and
a second optical monitor detector to receive and detect the second monitor beam; and
wherein the feedback control unit is configured to produce the control signal based on the output of the optical monitor detector and output from the second optical monitor to control the polarization of light to the polarization beam splitter to increase optical power of the monitor beam detected at the optical monitor detector and to decrease optical power of the second monitor beam detected at the second optical monitor detector.

3. The system as in claim 2, wherein the PDM receiver comprises:
a polarization mode dispersion compensator located in an optical path the received light from the transmission link upstream from the polarization beam splitter, the polarization mode dispersion compensator configured to operate under control of the feedback control unit based on the outputs of the optical monitor detector and the second optical monitor detector to compensate for polarization mode dispersion in the received light from the transmission link.

4. The system as in claim 3, wherein the polarization mode dispersion compensator comprises:
a second dynamic polarization controller to control polarization of light in response to control by the feedback control unit; and
a differential group delay unit to produce a differential group delay in light.

5. The system as in claim 4, wherein the different group delay unit produces an adjustable differential group delay in response to control by the feedback control unit.

6. The system as in claim 1, wherein the PDM transmitter is configured to make the monitor signal wavelength to be close to the optical signal wavelength.

7. The system as in claim 1, wherein the PDM transmitter comprises:
a first optical transmitter to produce the first optical signal;
a second optical transmitter to produce the second optical signal;
a third optical transmitter to produce the light at the monitor signal wavelength;
a beam combiner to combine the light at the monitor signal wavelength and the first optical signal into a combined beam in the first optical polarization; and
a polarization beam combiner to combine the combined beam and the second optical signal into the light output by the PDM transmitter.

8. The system as in claim 1, wherein the PDM transmitter comprises:
an optical transmitter to produce light at the optical signal wavelength in the first optical polarization;
a beam splitter to split the light from the first optical transmitter into a first light beam and a second light beam, both in the first optical polarization;
a first optical modulator to modulate the first light beam to carry the first data channel as the first optical signal;
a second optical transmitter to modulate the second light beam to carry the second data channel to produce a modulated second light beam;
a polarization rotator to receive the modulated second light beam and to rotate polarization of the modulated second light beam to be in the second optical polarization as the second optical signal;
an optical monitor transmitter to produce the light at the monitor signal wavelength;
a beam combiner to combine the light at the monitor signal wavelength and the first optical signal into a combined beam in the first optical polarization; and
a polarization beam combiner to combine the combined beam and the second optical signal into the light output by the PDM transmitter.

9. An optical communication system for optical communicating based on polarization division multiplexing (PDM), comprising:
a PDM transmitter comprising (1) a first optical transmitter to produce a first optical signal carrying a first data channel in a first optical polarization and at a first optical signal wavelength, (2) a second optical transmitter to produce a second optical signal carrying a second data channel at a second optical polarization different from the first optical polarization and at a second optical signal wavelength that is different from the first optical signal wavelength, and (3) a third optical transmitter to produce light at a monitor signal wavelength different from the first and the second optical signal wavelengths and in the first optical polarization;
a transmission link to receive and transmit the light from the PDM transmitter; and
a PDM receiver to receive light from the transmission link and comprising:
a dynamic polarization controller to control polarization of the received light in response to a control signal to produce output light;
a polarization beam splitter to split the output light from the dynamic polarization controller into (1) a first beam comprising the first optical signal at the first optical signal wavelength and (2) a second beam comprising a second optical signal at the second optical signal wavelength, wherein the first and second beams are in orthogonal polarizations to each other;
a monitor beam splitting unit in an optical path of the first beam to split the first beam into (1) a monitor beam at the monitor signal wavelength and (2) the first optical signal;
a first optical detector to receive and detector the first optical signal;
a second optical detector to receive at least a portion of the second beam to detect the second optical signal;
an optical monitor detector to receive and detect the monitor beam; and
a feedback control unit to produce the control signal based an output of the optical monitor detector to control the polarization of light to the polarization beam splitter to increase optical power of the monitor beam detected at the optical monitor detector and to separate the first data channel and the second data channel into the first optical signal and the second optical signal, respectively.

10. The system as in claim 9, wherein the PDM receiver comprises:
a second monitor beam splitting unit in an optical path of the second beam to split the second beam into (1) a second monitor beam at the monitor signal wavelength and (2) the second optical signal directed to the second optical detector; and a second optical monitor detector to receive and detect the second monitor beam; and wherein the feedback control unit is configured to produce the control signal based on the output of the optical monitor detector and output from the second optical monitor to control the polarization of light to the polarization beam splitter to increase optical power of the monitor beam detected at the optical monitor detector and to decrease optical power of the second monitor beam detected at the second optical monitor detector.

11. The system as in claim 10, wherein the PDM receiver comprises:

a polarization mode dispersion compensator located in an optical path the received light from the transmission link upstream from the polarization beam splitter, the polarization mode dispersion compensator configured to operate under control of the feedback control unit based on the outputs of the optical monitor detector and the second optical monitor detector to compensate for polarization mode dispersion in the received light from the transmission link.

12. The system as in claim 11, wherein the polarization mode dispersion compensator comprises:

a second dynamic polarization controller to control polarization of light in response to control by the feedback control unit; and a differential group delay unit to produce a differential group delay in light.

13. The system as in claim 12, wherein the different group delay unit produces an adjustable differential group delay in response to control by the feedback control unit.

14. The system as in claim 9, wherein the monitor signal wavelength is closer to the first optical signal wavelength than the second optical wavelength.

15. A method for optical communications based on polarization division multiplexing (PDM), comprising:

generating an optical PDM transmission signal that comprises (1) a first optical signal carrying a first data channel in a first optical polarization and at a first optical signal wavelength, (2) a second optical signal carrying a second data channel at a second optical polarization different from the first optical polarization and at a second optical signal wavelength, and (3) light at a monitor signal wavelength different from the first and second optical signal wavelengths and in the first optical polarization;

transmitting the optical PDM transmission signal over a transmission link to a destination;

at the destination, controlling a dynamic polarization controller to control polarization of the received light in response to a control signal;

using a polarization beam splitter to split output light from the dynamic polarization controller into a first beam and a second beam, wherein the first and second beams being in orthogonal polarizations;

splitting the first beam into (1) a monitor beam at the monitor signal wavelength and (2) a first detector beam at one or more wavelengths different from the monitor signal wavelength;

using a first optical detector to receive and detect the first detector beam to extract the first data channel;

using a second optical detector to receive and detect at least a portion of the second beam to extract the second data channel;

using an optical monitor detector to receive the monitor beam and to measure optical power of the monitor beam; and operating a feedback control unit to produce the control signal based on the measured optical power at the optical monitor detector to control the polarization of light incident to the polarization beam splitter to increase the measured optical power of the monitor beam detected at the optical monitor detector.

16. The method as in claim 15, wherein the first and second optical signal wavelengths are different and the monitor signal wavelength is closer to the first optical signal wavelength than the second optical signal wavelength.

17. The method as in claim 15, wherein the first and second optical signal wavelengths are equal.

18. The method as in claim 15, comprising:

using a second monitor beam splitting unit in an optical path of the second beam to split the second beam into (1) a second monitor beam at the monitor signal wavelength and (2) a second detector beam at one or more wavelengths different from the monitor signal wavelength;

using a second optical monitor detector to receive and detect the second monitor beam;

directing the second detector beam into the second detector; and operating the feedback control unit to produce the control signal based on the output of the optical monitor detector and output from the second optical monitor to control the polarization of light to the polarization beam splitter to increase optical power of the monitor beam detected at the optical monitor detector and to decrease optical power of the second monitor beam detected at the second optical monitor detector.

19. The method as in claim 18, comprising:

using a polarization mode dispersion compensator located in an optical path the received light from the transmission link upstream from the polarization beam splitter to operate under control of the feedback control unit based on the outputs of the optical monitor detector and the second optical monitor detector to compensate for polarization mode dispersion in the received light from the transmission link.

20. A method for optical communications based on polarization division multiplexing (PDM), comprising:

generating an optical PDM transmission signal that comprises (1) a first optical signal carrying a first data channel with a first spectrum width in a first optical polarization and at an optical signal wavelength, (2) a second optical signal carrying a second data channel with a second spectrum width less than the first spectrum width at a second optical polarization different from the first optical polarization and at the optical signal wavelength;

transmitting the optical PDM transmission signal over a transmission link to a destination;

at the destination, controlling a dynamic polarization controller to control polarization of the received light in response to a control signal;

using a polarization beam splitter to split output light from the dynamic polarization controller into a first beam and a second beam, wherein the first and second beams being in orthogonal polarizations;

splitting the first beam into (1) a monitor beam and (2) a first detector beam;

optically filtering the monitor beam to produce a filtered monitor beam that is centered at an optical monitor signal wavelength outside the second spectrum width of the second data channel carried by the first beam;

using a first optical detector to receive and detect the first detector beam to extract the first data channel;

using a second optical detector to receive and detect the second beam to extract the second data channel;

using an optical monitor detector to receive the filtered monitor beam and to measure optical power of the filtered monitor beam; and operating a feedback control unit to produce the control signal based on the measured optical power at the optical monitor detector to control the polarization of light incident to the polarization beam splitter to increase the measured optical power of the monitor beam detected at the optical monitor detector.

21. An optical communication system utilizing polarization division multiplexing (PDM), comprising:
a PDM optical transmitter that produces an optical PDM signal which comprises
(1) two optical data channels in first and second mutually orthogonal optical polarizations that respectively carry two different data channels and
(2) one optical monitor channel in the first optical polarization at a different optical wavelength from optical wavelengths of the two optical data channels;
an optical fiber transmission link coupled to receive the optical PDM signal from the PDM transmitter and to transmit the optical PDM signal to a destination; and
a PDM receiver located at the destination and coupled to an end of the optical fiber transmission link to demultiplex the two optical data channels received from the optical fiber transmission link, the PDM receiver comprising an optical monitor detector that detects the optical monitor channel and a feedback control loop using monitor channel information in an output of the optical monitor detector to control the demultiplexing of the two optical data channels and to increase an output power of a monitor beam detected at the optical monitor detector.

22. The system as in claim 21, wherein the PDM transmitter comprises a polarization beam combiner that combines the two optical data channels and the optical monitor channel into a single optical beam as the optical PDM signal to the optical fiber transmission link.

23. The system as in claim 21, wherein the PDM receiver comprises
a dynamic polarization controller operable to control polarization of received light; and
a polarization beam splitter downstream from the dynamic polarization controller to split received light from the dynamic polarization controller into two beams of orthogonal polarizations.

24. The system as in claim 23, wherein the PDM receiver comprises two signal arms to receive the two beams from the polarization beam splitter and two optical detectors respectively in the two signal arms to detect the two different data channels, respectively.

25. The system as in claim 24, wherein the PDM receiver comprises a wavelength demultiplexer in at least one signal arm to separate the optical monitor channel and one optical data channel based on a wavelength difference between the optical monitor channel and the one optical data channel.

26. The system as in claim 24, wherein the two data channels are at different data rates, and wherein the PDM receiver comprises:
an optical filter in one of the two signal arms to filter a beam carrying the data channel with a higher data rate than the other data channel to extract the optical monitor channel.

27. An optical communication system based on polarization division multiplexing (PDM), comprising:
a PDM transmitter that produces a PDM transmission signal comprising two different optical data channels that are multiplexed based on PDM, wherein the PDM transmitter produces an optical monitor channel in the same optical polarization with one of the two different optical data channels and at a different optical wavelength from optical wavelengths of the two different optical data channels, which is included with the two optical channels in orthogonal polarizations as part of the optical PDM transmission signal;
a transmission link to transmit the PDM transmission signal; and
a PDM receiver that receives the PDM transmission signal and demultiplexes the received PDM transmission signal to recover two different data channels that are multiplexed based on PDM, wherein the PDM receiver extracts and detects the optical monitor channel to provide a feedback control in demultiplexing the received PDM transmission signal to recover two different data channels that are multiplexed based on PDM and to increase an output power of a monitor beam detected by the PDM receiver.

28. The system as in claim 27, wherein the PDM receiver includes a polarization controller and a polarization beam splitter to perform demultiplexing the received PDM transmission signal to recover two different data channels that are multiplexed based on PDM.

29. The system as in claim 28, wherein the PDM receiver includes a polarization mode dispersion compensator upstream from the polarization beam splitter to reduce polarization mode dispersion.

* * * * *

UNITED STATES PATENT AND TRADEMARK OFFICE
CERTIFICATE OF CORRECTION

PATENT NO.         : 8,073,326 B2                                    Page 1 of 1
APPLICATION NO.    : 11/949723
DATED              : December 6, 2011
INVENTOR(S)        : Lianshan Yan et al.

It is certified that error appears in the above-identified patent and that said Letters Patent is hereby corrected as shown below:

In Column 8, Line 5, please delete "photodectors" and insert -- photodetectors --, therefor.

In Column 10, Line 16, please delete "features," and insert -- features --, therefor.

In Column 12, Line 50, in Claim 9, please delete "and detector" and insert -- and detect --, therefor.

Signed and Sealed this
Twenty-seventh Day of March, 2012

David J. Kappos
*Director of the United States Patent and Trademark Office*